Jan. 6, 1953     B. T. VIRTUE     2,624,105

METHOD OF PREPARING AND ASSEMBLING ANTIFRICTION BEARINGS

Original Filed May 3, 1951

INVENTOR
Byron T. Virtue.

BY Mason, Porter, Diller T Stewart

ATTORNEYS

Patented Jan. 6, 1953

2,624,105

UNITED STATES PATENT OFFICE 2,624,105

METHOD OF PREPARING AND ASSEMBLING ANTIFRICTION BEARINGS

Byron T. Virtue, Litchfield, Conn., assignor to The Torrington Company, Torrington, Conn., a corporation of Maine Application May 15, 1951, Serial No. 226,397

1 Claim. (Cl. 29—148.4)

The invention relates to new and useful improvements in a method of preparing and assembling an anti-friction bearing and more particularly the outer race of a bearing for a crank shaft, which bearing is disposed intermediate the crank arms of the shaft.

An object of the invention is to provide a method whereby a bearing race can be finished ready for installing and then fractured to form semi-cylindrical sections for aid in assembling on a crank shaft at points intermediate the crank arms of the shaft.

A further object of the invention is to provide a method of the above type wherein a snap ring fitting in a tapered groove in the outer surface of the race and nearer one end than the other holds the parts in assembled relation during fracturing and during handling and shipment to a place of use.

A further object of the invention is to provide a method of fracturing the race which includes notching the ends of the race in a plane substantially diametrically thereof and extending longitudinally of the race, placing the race on an arbor shaped so that the regions to be fractured are unsupported, and striking the race with a ram in a ram press at one side of the race and in the region to be fractured.

These and other objects will in part be obvious and will in part be hereinafter more fully disclosed.

Figure 1:
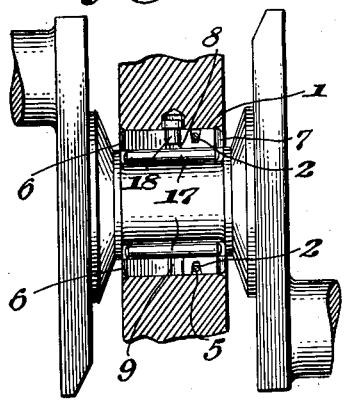
Figure 1 is a vertical sectional view through a portion of a crank shaft showing the anti-friction bearing assembled on the shaft between adjacent crank arms and the shaft in position in the engine block.
Figure 2:
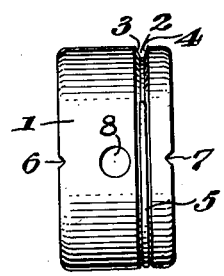
Figure 2 is a side view of the outer race in its its finished condition and prior to the fracturing of the same.
Figure 3:
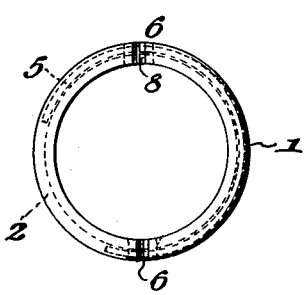
Figure 3 is an end view of the race.
Figure 4:
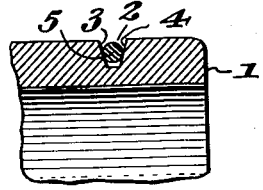
Figure 4 is an enlarged section showing the shape of the groove and the snap ring in place therein.
Figure 5:
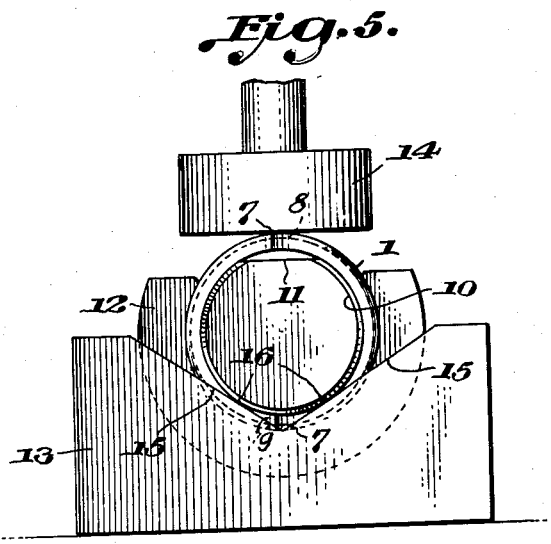
Figure 5 is a view in elevation showing an arbor on which the race has been placed, a restraining block slipped over the race and the arbor located on the supporting anvils of a press ram and also the head of the ram which strikes the race for fracturing the same.
Figure 6:
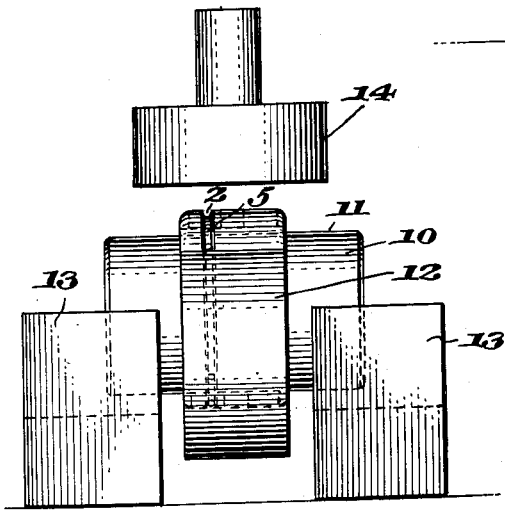
Figure 6 is a side view of the parts shown in Figure 5.
Figure 7:
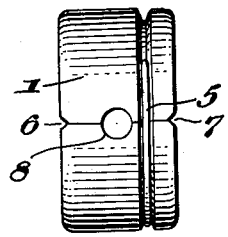
Figure 7 is a side view of the race after it has been fractured with the snap ring in place and holding the fractured sections in mating contact.

In the present illustrated embodiment of the invention the improved method is shown as employed in the preparing of an outer race for a crank shaft and the assembling of the bearing race on the crank shaft between the crank arms thereof.

In carrying out the method the outer bearing race, indicated at 1, is cylindrical and formed and dimensioned on an ordinary screw machine. During this operation an annular groove 2 is formed in the outer surface of the race nearer one end than the other of the race. This groove has tapered walls 3 and 4. A split ring 5 often referred to as a snap ring is placed in the groove. This snap ring is dimensioned in cross section so that it engages the tapered walls 3 and 4. The race is then provided with V notches 6, 6 and 7, 7. These notches are located in a plane substantially diametrically thereof and extending longitudinally of the race. Holes 8 and 9 may be formed radially through the race and preferably on a line extending transversely from the notch at one end of the race to the notch at the other end thereof. The race thus formed is heat treated to minimum hardness specifications, after which the race is ground and polished to a dimensioned or finished size.

The snap ring is inserted in the groove and then the race is placed on an anvil 10. This anvil has a flat side 11. A restraining block 12 is placed around the race. This restraining block only extends partly around the race and is positioned so that the notches at one side of the race are midway between the ends of the restraining block and these notches are also midway between the ends of the flat surface 11 or the anvil. The parts thus assembled are placed on supporting blocks 13, 13 in a ram press. The head of the ram or punch is indicated at 14. These supporting blocks have inclining surfaces 15, 15 which contact with the race at points 16, 16 which are spaced away from the notches 7, 7. The race is unsupported in the region of the notches 6, 6 and 7, 7. The head 14 of the ram press is of greater length than the width of the bearing so that when the head strikes the bearing it will contact with the race along a line joining the notches 6 and 7, at the upper side of the race. This blow against the race in the region stated results in a fracturing of the race both at the upper and lower sides extending from the notches 6, 6 to the notches 7, 7. The purpose of the restraining block 12 is to avoid distortion of the race. Without this restraining block the race when fractured is very likely to become distorted and out of round. The snap ring, while it will yield to permit fracturing, will also hold the fractured parts in mating contact for handling and shipping to the place of use.

The improved race thus constructed by the method described is shown, described and claimed as an article of manufacture in my co-pending application Serial No. 224,403, filed May 3, 1951.

After the race has been prepared by the method described above, then the method of installing the race in the place of use is as follows: The snap ring is removed and the two sections separated and anti-friction rolls which are illustrated at 17 in Figure 1 of the drawings are either placed in the half section or on the bearing shaft between the crank arms. A light grease or petrolatum is used for holding the rollers in place during assembly. The two sections of the race are then placed on the shaft with the grooves in the two sections in alinement and the snap ring is placed in the groove. Inasmuch as the walls are tapered and the snap ring is dimensioned so as to contact with the tapered walls, this snap ring will aid in alining the sections axially, that is, in their original location so that the fractured surfaces will have mating contact. After the races have been applied to the crank shaft then the crank shaft may be placed in the engine block and the fractured outer race will be clamped between the appropriate bosses in the engine block securing it in place and holding the fractured halves from separation diametrically. The bearing race is held from shifting by placing a dowel pin 18 in one of the openings in the race, which dowel pin engages a recess in the engine block. The other opening may be used to supply lubrication to the bearing. While needle rollers are referred to and shown as used in connection with the race, it will be understood that other types of anti-friction members may be used with very little change in the outer race.

While the method described above of fracturing the race is preferred, it will be understood that from certain aspects of the invention other methods may be used for the fracturing of the race. The applying of the snap ring to the race before fracturing has, however, the advantage of holding the fractured sections in mating contact and at the same time said snap ring will yield sufficiently to permit the fracturing.

It is obvious that minor changes in the method described may be made without departing from the spirit of the invention as set forth in the appended claim.

I claim:

The method of preparing and assembling bearings on a crank shaft comprising forming and finishing an outer bearing race having an annular groove with tapered walls in the outer face of the race disposed at one side of the center of the race and longitudinally opposed V-notches in the ends of the race, placing a split ring in said groove dimensioned so as to engage the tapered walls thereof, supporting said race and subjecting the same to a blow for fracturing the race along the lines extending from the notches at one end of the race to the notches at the other end thereof while engaged by the split ring, removing the ring so as to separate the fractured sections, assembling the anti-friction members to be used therewith in place, reassembling the fractured sections on the crank shaft with the ends of the groove in alignment and replacing the split ring in the groove for holding the fractured sections in alignment and their fractured surfaces in mating contact.

BYRON T. VIRTUE.

REFERENCES CITED

The following references are of record in the file of this patent:

UNITED STATES PATENTS

| Number | Name | Date |
| --- | --- | --- |
| 1,498,748 | Pierce, Jr. | June 24, 1924 |
| 1,906,259 | Gibbons | May 2, 1933 |
| 2,371,399 | Mantle | Mar. 13, 1945 |